United States Patent [19]

Tuckey

[11] Patent Number: 4,728,264
[45] Date of Patent: Mar. 1, 1988

[54] FUEL DELIVERY SYSTEM WITH PRESSURE-CONTROLLED ELECTRIC PUMP

[75] Inventor: Charles H. Tuckey, Cass City, Mich.
[73] Assignee: Walbro Corporation, Cass City, Mich.
[21] Appl. No.: 917,633
[22] Filed: Oct. 10, 1986
[51] Int. Cl.⁴ .................... F04B 49/06; H01H 35/40
[52] U.S. Cl. ................... 417/44; 200/83 N; 307/118
[58] Field of Search .............. 417/44, 38, 366; 307/118; 200/83 N

[56] References Cited

U.S. PATENT DOCUMENTS

| | | | |
|---|---|---|---|
| 1,560,044 | 11/1925 | Derrick | 417/44 |
| 2,477,801 | 8/1949 | Hathaway | 200/83 N |
| 2,717,553 | 9/1955 | Parker | 417/44 |
| 3,005,067 | 10/1961 | Leibold et al. | 200/83 N |
| 3,104,614 | 9/1963 | Gramenzi | 417/38 X |
| 3,119,437 | 1/1964 | Roosa | 200/83 N X |
| 3,345,479 | 10/1967 | Schaber | 200/83 N |
| 3,600,601 | 8/1971 | Ayres | 304/118 |
| 3,657,556 | 4/1972 | Foster | 307/118 |
| 3,738,776 | 6/1973 | Debare | 417/44 X |
| 4,118,612 | 10/1978 | Gabus | 200/83 N |
| 4,205,237 | 5/1980 | Miller | 307/118 |
| 4,447,192 | 5/1984 | Tuckey | 417/366 X |
| 4,462,758 | 7/1984 | Speed | 417/38 |

Primary Examiner—Carlton R. Croyle
Assistant Examiner—Paul F. Neils
Attorney, Agent, or Firm—Barnes, Kisselle, Raisch, Choate, Whittemore & Hulbert

[57] ABSTRACT

A fuel delivery system which includes a fuel pump and a dc motor, which are preferably contained within a unitary housing. A pressure-sensitive switch, which is either contained within the unitary pump/motor housing or as a separate structure, includes a movable contact positioned within a housing so as to form a first chamber for receiving fuel under pressure and a second chamber for venting to atmosphere. A spring urges the movable contact against a second contact for applying electrical power to the pump motor. When the pump output pressure exceeds the force exerted on the movable contact by the spring, electrical conduction between the switch contacts is broken and motor power is interrupted. Current to the pump motor is thus pulse-width modulated as a function of pump output pressure, fuel demand, and the adjustable force exerted by the pressure switch spring.

1 Claim, 3 Drawing Figures

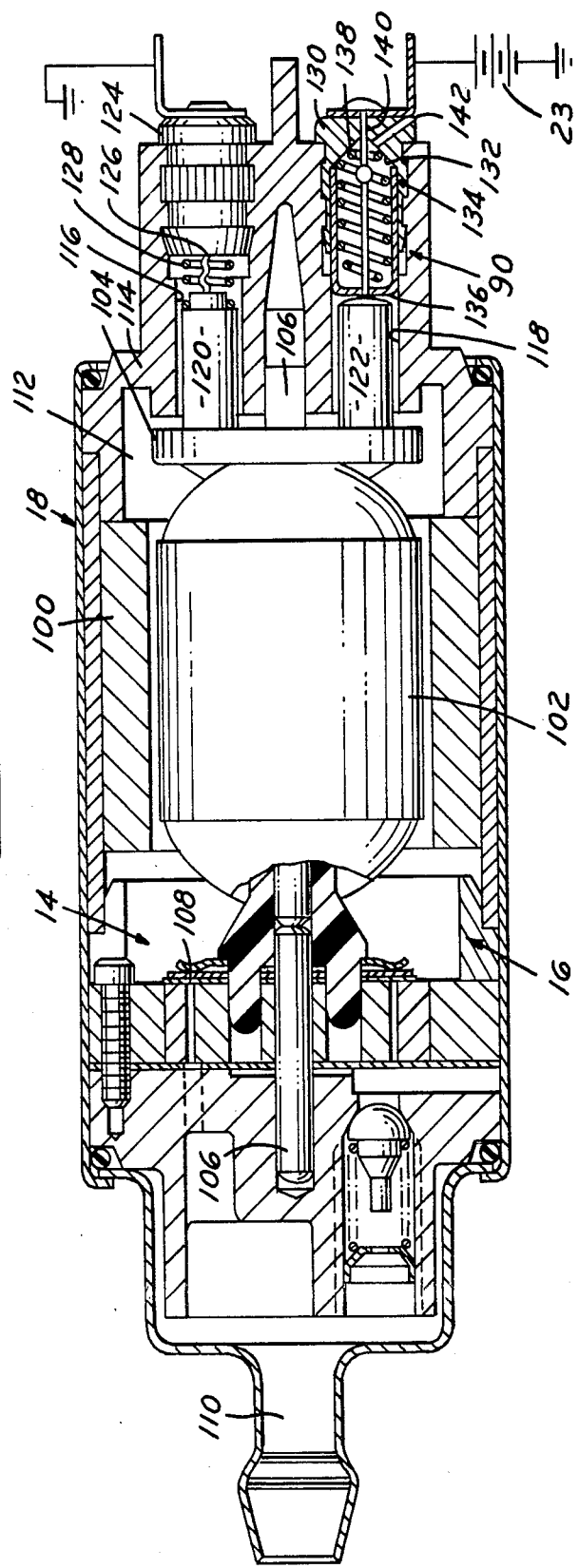

FUEL DELIVERY SYSTEM WITH PRESSURE-CONTROLLED ELECTRIC PUMP

The present invention is directed to electric pumps fuel delivery systems for gasoline engine and like applications, and more particularly to control of fuel line pressure at the pump output.

It is an object of the present invention to provide pressure control for the electric pump in a fuel delivery system which reduces energy consumption and increases pump life, which reduces pump noise, and which maintains constant pressure in the fuel delivery line to the engine.

A more specific object of the present invention is to provide a fuel delivery system of the described character which finds particular utility in electronic fuel injection systems and which reduces the quantity of heated fuel recirculated in such systems to the fuel tank.

The invention, together with additional objects, features and advantages thereof, will be best understood from the following description, the appended claims and the accompanying drawings in which:

FIG. 3 is a longitudinal section of a fuel pump embodying pressure control in accordance with a third embodiment of the invention.

Figure 1:
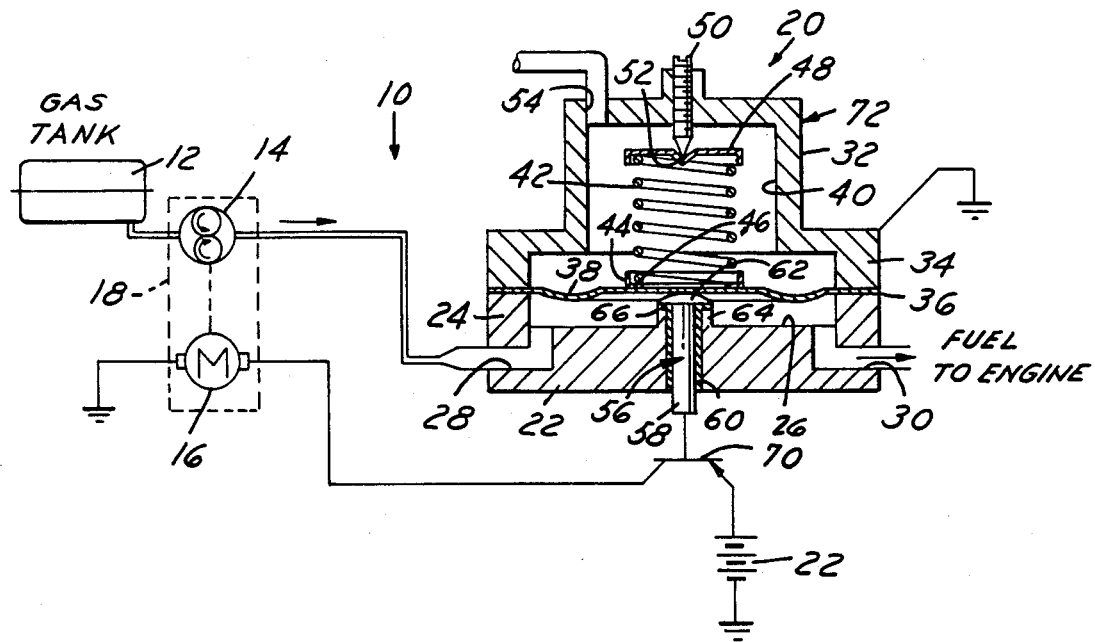
FIG. 1 is a schematic diagram of a fuel delivery system in accordance with one presently preferred embodiment of the invention.

FIG. 1 illustrates a fuel delivery system 10 in accordance with a first embodiment of the invention as comprising a fuel pump 14 having an input coupled to a fuel supply at the gasoline tank 12 and an output for delivering fuel to an engine (not shown). An electric motor 16 is mechanically coupled to pump 14 and electrically connected to a source of power for driving pump 14. Most preferably, pump 14 and motor 16 are provided in a unitary assembly 18 such as those disclosed in applicant's U.S. Pat. Nos. 4,352,641, 4,500,270 and 4,596,519, all of which are assigned to the assignee hereof. A fuel pressure regulator 20 in the form of a pressure-sensitive electrical switch is coupled to the output of pump 14 and electrically connected to the inputs of motor 16 for selectively connecting and disconnecting motor 16 to battery 23 as a function of pump output pressure. More specifically, switch 20 includes a flat base 22 having a peripheral upstanding lip 24 which cooperates with base 22 to form a central depression or pocket 26. An inlet passage 28 extends form pocket 26 through base 22 for connection to pump 14, and an outlet passage 30 spaced from inlet passage 28 connects pocket 26 to the vehicle engine (not shown). A generally cup-shaped cap 32 has a peripheral depending lip 34 opposed to base lip 24 and cooperating therewith to capture therebetween the periphery 36 of a flexible diaphragm 38. Cap 32 extends upwardly from diaphragm 38 to form a second hollow chamber 40 separated by diaphragm 38 from the chamber formed between diaphragm 38 and base pocket 26.

A coil spring 42 is captured between a flanged keeper 48 and a cup 44 carried by the generally flat central portion 46 of diaphragm 38. An adjustment screw 50 is threadably received in cap 32 and engages a central depression 52 in keeper 48 for selectively adjusting the force exerted by spring 42 against central portion 46 of diaphragm 38. Cap 32 includes an aperture 54 for venting chamber 40 to atmosphere. An electrode 56 includes a cylindrical shank or stem 58 extending through an insulating sleeve 60 in base 22 coaxially with spring 42 and screw 50, and a head 62 carried by and spaced from a boss 64 on base 22 by the flange 66 on insulating sleeve 60. Electrode head 62 has a convex surface opposed to the flat central portion 46 of diaphragm 38. A PNP transistor 70 has a base connected to the shank 58 of electrode 56, and has primary current-conducting emitter and collector electrodes connected to dc supply 23 and motor 16. Base 22 and cap 32 form a housing 72 and are preferably constructed of electrically conductive material along with diaphragm 38 for connection to electrical ground through the vehicle frame.

In operation, diaphragm 38, which forms a first electrical contact of switch 20, is normally urged by spring 42 against head 62 of electrode 60 so as to connect the base of transistor 70 to electrical ground, and thereby feed electrical power from battery 23 to motor 16. When fuel pressure from the output of pump against the surface area of diaphragm 38 within the fuel chamber formed by pocket 26 is sufficient to overcome the force of spring 42, electrical contact between diaphragm 38 and electrode 56 is interrupted, transistor 70 is turned off, and power is removed from motor 16. Current to motor 16 is thus pulse-width modulated as a function of reference spring pressure exerted by spring 42 and engine fuel demand, as compared with the output supplied by pump 14.

Figure 2:
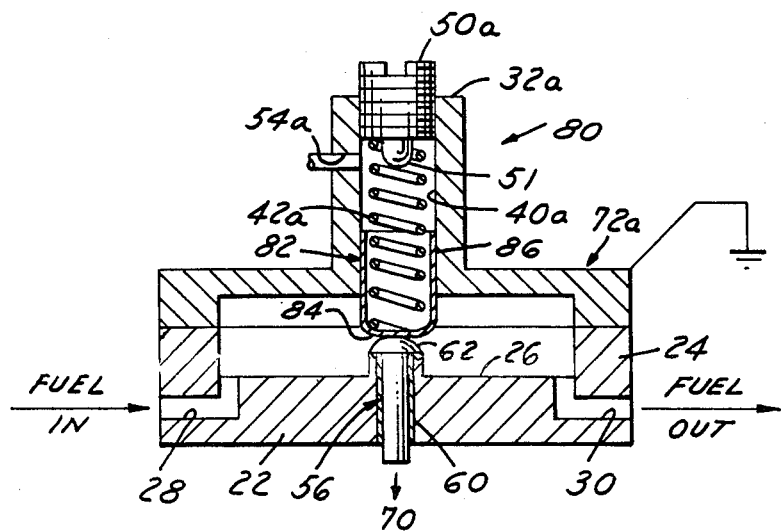
FIG. 2 is a fragmentary schematic diagram of a modification to the fuel delivery system of FIG. 1.

FIG. 2 illustrates a modified embodiment 80 of pressure switch 20 (FIG. 1) in which components identical to those hereinabove described in connection with FIG. 1 are indicated by correspondingly identical reference numerals, and elements which are different from those illustrated in FIG. 1 but perform an analogous function are indicated by correspondingly identical reference numerals followed by the suffix "a". In switch 80 of FIG. 2, the movable pressure-responsive contact comprises a hollow cup-shaped piston 82 having a convex head 84 axially opposed to and aligned with the convex head 62 of electrode 56, and a cylindrical skirt 86 axially slidable within a cylindrical chamber 40a in cap 32a. Cap 32a includes a passage 54a for venting chamber 40a to atmosphere, and a screw 50a is received in cap 32a for adjusting the pressure exerted by the coil spring 42a against the inside surface of piston head 84. Thus, in the embodiment of FIG. 2, fuel pressure against piston head 84 and spring 42a within the lower chamber formed by base pocket 26 urges piston 82 out of contact with electrode 56 so as to remove power from pump motor 16 (FIG. 1). Electrical contact with piston 82 is obtained through cap 72a, screw 50a and spring 42a. It will be noted in FIG. 2 that spring 42a is captured by a nub 51 on screw 50a.

FIG. 3 illustrates an embodiment of the invention wherein pressure switch 90 is built into the unitary housing 18 of pump 14 and motor 16. Pump 14 and motor 16 are similar to those illustrated in above-noted U.S. Pat. No. 4,352,641, to which reference may be made for details of construction. In general, motor 16 includes a permanent magnet stator 100 which surrounds a rotor 102 having windings connected to a commutator plate 104. Armature 102 is carried by a shaft 106 for rotation within housing 18, and is coupled to a vane system 108 for pumping fuel from the inlet 110 to a pressure chamber 112 which surrounds armature 102, and thence to a pump outlet (not shown) formed in the housing base 114. Spaced passages 116, 118 parallel to the axis of rotation of armature 102 and shaft 106 respectively slidably receive brushes 120, 122 for applying power to commutator 104. A first electrical terminal 124 is received in base 114 to close passage 116, and is electrically connected to brush 120 by the conductor 126. A spring 128 urges brush 120 against commutator 104. A second terminal 130 is received in base 114 and has an internal chamber 132 which slidably receives a piston 134. Piston 134 has a head 136 which is internally urged by a coil spring 138 against brush 122. Spring 138 and piston 134 thus urge brush 122 against commutator 104. An electrical conductor 140 extends from terminal 130 to piston head 136. A passage 142 in terminal 130 vents chamber 132 to atmosphere. Terminals 124, 130 are connected across a source of dc power, such as battery 23.

In operation, fuel pressure within output chamber 112 operates through passage 118 against piston 134 and urges piston 134 out of electrical contact with brush 122 when fuel pressure exceeds the force exerted on piston 136 by spring 138. Thus, operation of the embodiment of FIG. 3 is similar to that of the embodiment of FIG. 2, except that pressure switch 90 is in the direct current path between power source 23 and motor 16, rather than in the current control path as in the embodiments of FIGS. 1 and 2. Thus, the embodiments of FIGS. 1 and 2 possess an advantage over that of FIG. 3 in that the former conduct less electrical current through the switch contacts, and thus are less susceptible to pitting at the contacts and arcing at the motor brush.

The invention claimed is:

1. A fuel delivery system for gasoline engine and like applications comprising:

a pump having an input for coupling to a fuel supply, an output for fuel delivery and a d.c. motor having an output drivably coupled to said pump, a pressure switch comprising a housing of electrically conductive metallic construction including a base having an essentially flat internal wall and a peripheral lip upstanding from said wall, a cup-shaped cap having a periphery opposed to said base lip to define an open internal cavity between said base and said cap, means for connecting said housing to electrical ground, a diaphragm of electrically conductive construction mounted within said housing spanning said cavity and cooperating with said housing to divide said cavity into first and second chambers on opposite sides of said diaphragm, said diaphragm having a flat central portion parallel to said base internal wall and a peripheral portion captured between said lip and said cap periphery and electrically connected thereto, said diaphragm being spaced by said lip from said flat internal wall, a fuel inlet in said base adjacent to said peripheral portion of said diaphragm at one side edge of said first chamber for feeding fuel from said pump to said first chamber, a fuel outlet in said base adjacent to said peripheral portion of said diaphragm at an opposing side edge of said first chamber from said inlet such that fuel flows from said inlet to said outlet through said first chamber across and generally parallel to said flat central portion of said diaphragm and said essentially flat base wall, a switch electrode of electrically conductive construction having a convex head and a shank extending therefrom, insulating means mounting said switch electrode to said base with said head positioned within said first chamber in opposition to said flat central portion of said diaphragm and said shank extending through said base wall, said base including means spacing said head from said base wall so as to permit free flow of fuel from said inlet to said outlet between said wall and said diaphragm with said diaphragm in abutment with said switch electrode head, a coil spring in said second chamber having an axis aligned with said electrode head, a pair of opposed cupshaped means capturing opposed ends of said coil spring, one of said cup-shaped means being in engagement with said diaphragm central portion within said second chamber, adjustment means threadably received in said cap across said second chamber from said diaphragm and engaging the other of said cup-shaped means within said second chamber coaxially with said spring, said coil spring being captured in compression between said diaphragm and said adjustment means for urging said diaphragm central portion into abutting engagement with said switch electrode head within said first chamber, and means venting said second chamber to atmosphere, a source of d.c. power, and solid state switch means having primary current conducting electrodes connected between said source of d.c. power and said motor, and a control electrode coupled to said switch electrode shank externally of said housing, said solid state switch means being responsive to connection of said control electrode to electrical ground through said switch electrode, said diaphragm and said housing of said pressure switch to feed electrical power from said d.c. power source to said motor.

* * * * *